United States Patent
Wang

(10) Patent No.: US 6,363,961 B1
(45) Date of Patent: Apr. 2, 2002

(54) MASSAGE BATH TUB FAUCET STRUCTURE

(76) Inventor: Shih-Ming Wang, No. 110, Hsiao-Yang Rd., Chang Hua City (TW)

( * ) Notice: Subject to any disclaimer, the term of this patent is extended or adjusted under 35 U.S.C. 154(b) by 0 days.

(21) Appl. No.: 09/739,482

(22) Filed: Dec. 19, 2000

(51) Int. Cl.$^7$ ............................................. F16K 11/044
(52) U.S. Cl. .................. 137/119.05; 137/597; 137/801
(58) Field of Search ........................... 137/119.05, 597, 137/801

(56) References Cited

U.S. PATENT DOCUMENTS

| | | | | |
|---|---|---|---|---|
| 2,468,315 A | * | 4/1949 | Wagner | 137/801 |
| 3,297,046 A | * | 1/1967 | Hall | 137/119.05 |
| 4,592,388 A | * | 6/1986 | Wilcox | 137/801 |
| 5,813,436 A | * | 9/1998 | Chen | 137/801 |

* cited by examiner

Primary Examiner—Stephen M. Hepperle
(74) Attorney, Agent, or Firm—Harrison & Egbert

(57) ABSTRACT

A massage bath tub faucet structure including a convergent pipe which is connected with a first support pipe and a second support pipe in communication with a shower head. The first support pipe is provided in the wall with a locating edge. The first support pipe is fastened with a fastening hole of the faucet in conjunction with a fastening bolt. The first support pipe is provided therein to an internal pipe which is provided with a water hole in communication with the interior of the faucet. The internal pipe is provided therein with a pull rod for regulating the flow of water to the shower head or the faucet.

2 Claims, 7 Drawing Sheets

MASSAGE BATH TUB FAUCET STRUCTURE

BACKGROUND OF THE INVENTION

1. Field of the Invention

The present invention relates generally to a faucet, and more particularly to a bath tub faucet.

2. Description of Related Art

As shown in FIG. 1, a bath tub faucet 10 of the prior art is mounted on a seat 13 which is fastened to a bathroom wall 14. The at bath tub faucet 10 is provided with a fastening end 11 which is positioned by a C-shaped locating ring 12. The prior art bath tub faucet 10 is defective in design because the seat 13 must be removed from the bathroom wall 14 along with the faucet 10 when it is replaced.

BRIEF SUMMARY OF THE INVENTION

The primary objective of the present invention is to provide a bath tub faucet which can be replaced with ease and speed.

The bath tub faucet of the present invention is provided at the end to a fastening hole which is fastened with a support pipe in conjunction with a bolt. The support pipe is provided with an internal pipe and a pull rod for controlling water. The pull rod is provided at the bottom end with an annular protrusion by which the flow of water is directed to the faucet or a shower head.

The foregoing objective, features and functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
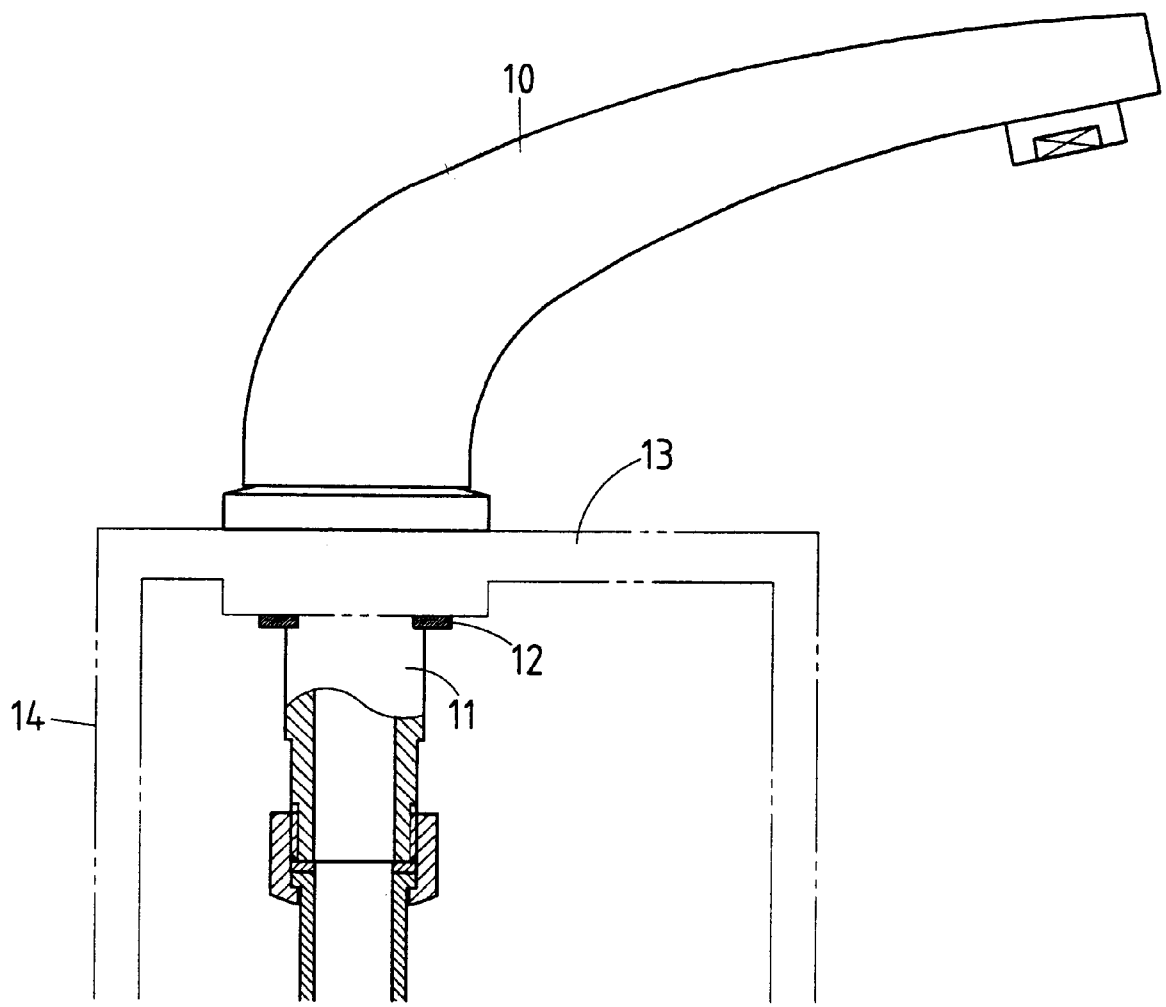
FIG. 1 shows a schematic view of a bath tub faucet of the prior art.
Figure 2:
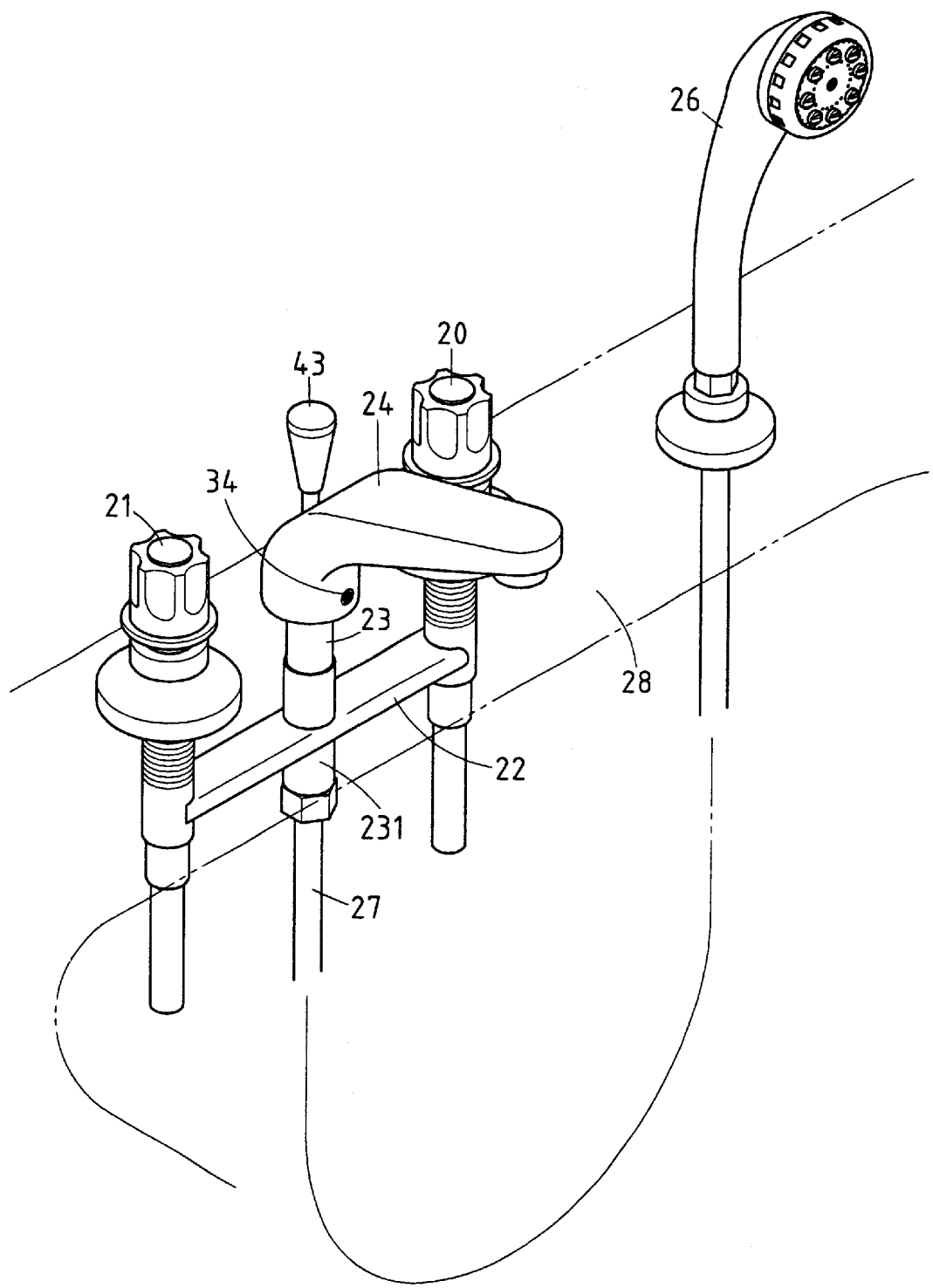
FIG. 2 shows a perspective view of the preferred embodiment of the present invention.
Figure 3:
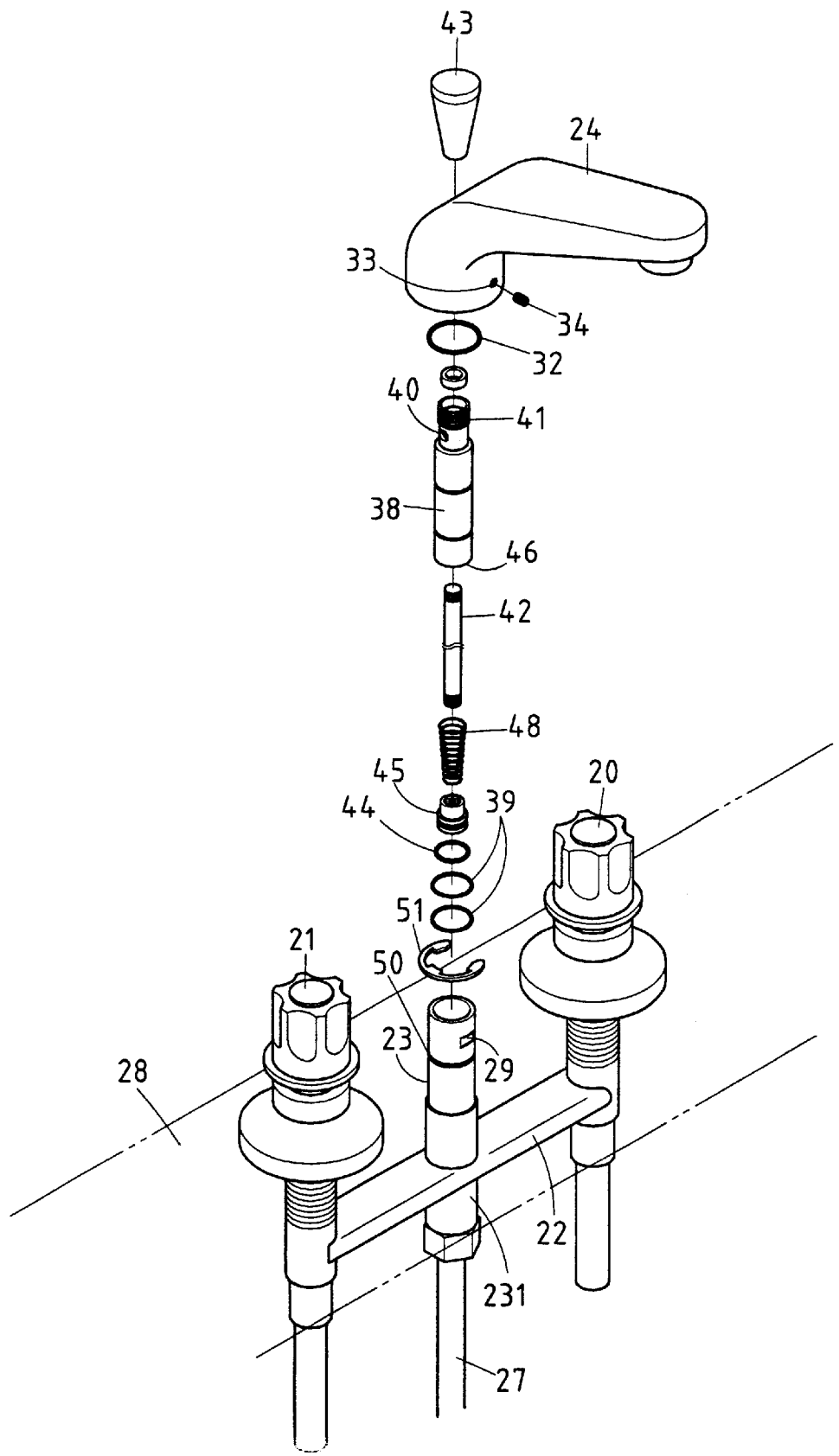
FIG. 3 shows an exploded view of the preferred embodiment of the present invention.
Figure 4:
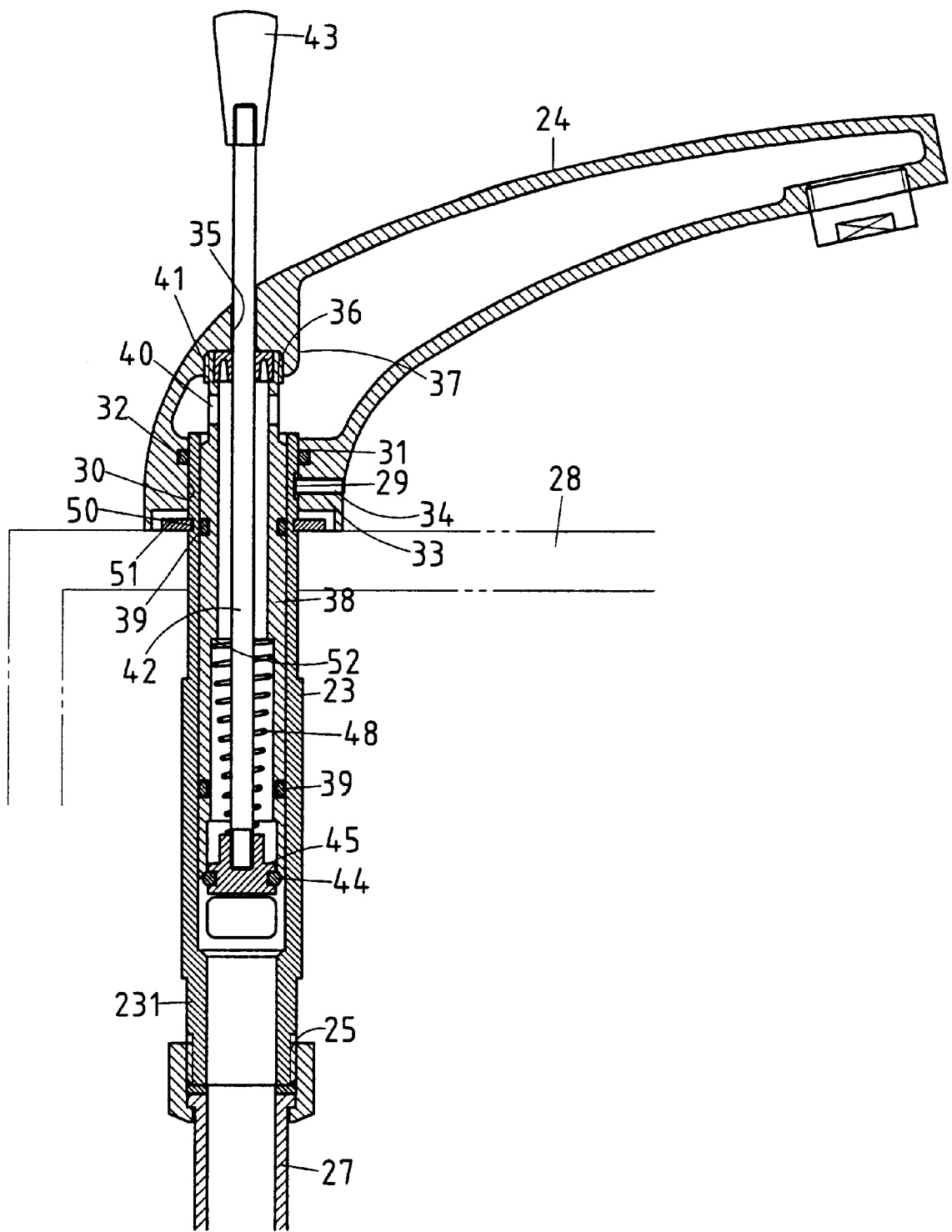
FIG. 4 shows a sectional schematic view of the preferred embodiment of the present invention.

As shown in FIGS. 2–4, a bath tub faucet structure embodied in the present invention is composed of a cold water valve 20, a hot water valve 21, and a convergent pipe 22 in communication with the cold water valve 20 and the hot water valve 21. The convergent pipe 22 is provided in the center with a first support pipe 23, which is fastened to a faucet 24. The structure of the present invention is characterized by the convergent pipe 22 which is provided with a second support pipe 231 corresponding in location to the first support pipe 23. The second support pipe 231 is provided with a threaded portion 25, which is engaged with one end of a guide tube 27 of a shower head 26. The top end of the support pipe 23 is extended through the face board 28 of the massage bath tub. The support pipe 23 is provided in the periphery with an annular retaining slot 50, a retaining ring 51 for retaining the support pipe 23, and a locating edge 29 for locating the faucet 24. The faucet 24 has a pipe hole 30 for connecting the support pipe 23. The pipe hole 30 is provided in the inner wall with an annular slot 31 and a washer 32 which is disposed in the annular slot 31. The pipe hole 30 is further provided in the inner wall with a fastening hole 33 and a bolt 34 which is engaged with the fastening hole 33 such that one end of the bolt 34 presses against the locating edge 29 so as to position the faucet 24. The faucet 24 is provided in the top edge of the interior thereof with a connection portion 37 having a through hole 35 and an inner threaded portion 36. The support pipe 23 is further provided therein with an internal pipe 38 which is provided in the inner wall with a stepped edge 52, and on the body with a plurality of water-stopping rings 39 in intimate contact with the inner wall of the support pipe 23, and a water hole 40 in communication with the interior of the faucet 24. The internal pipe 38 is provided at a top end with an outer threaded portion 41, which is engaged with the inner threaded portion 36 of the connection portion 37. The internal pipe 38 is provided therein with a pull rod 42 such that a control portion 43 of the top end of the pull rod 42 juts out of the connection portion 37 via the through hole 35 of the connection portion 37. The pull rod 42 is provided at the bottom end with an annular protrusion 45 having a water stopping ring 44. A spring 48 is disposed between the annular protrusion 45 and the stepped edge 52 of the internal pipe 38.

Figure 5:
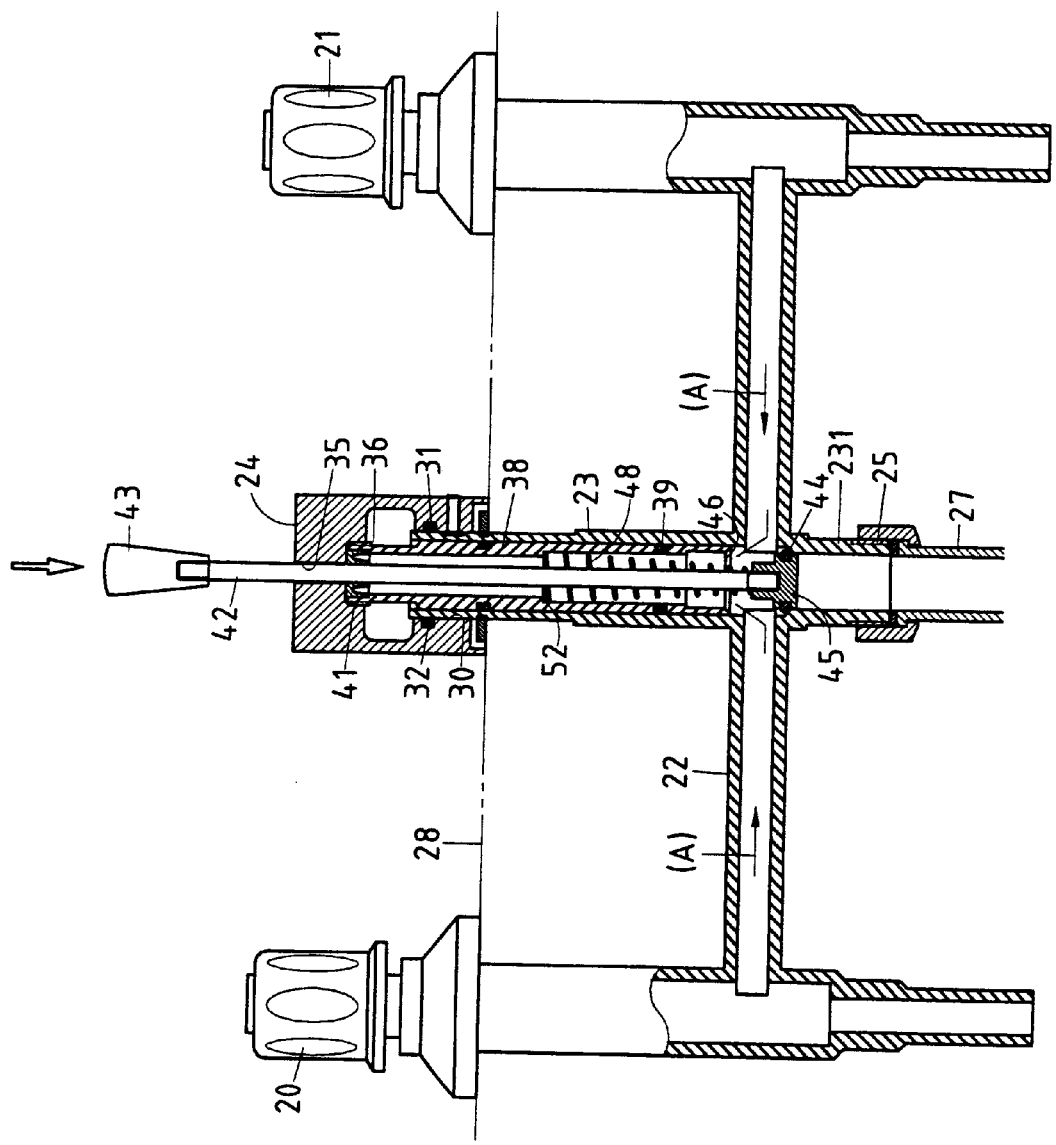
FIG. 5 shows a sectional schematic view of the preferred embodiment of the present invention at work.
Figure 6:
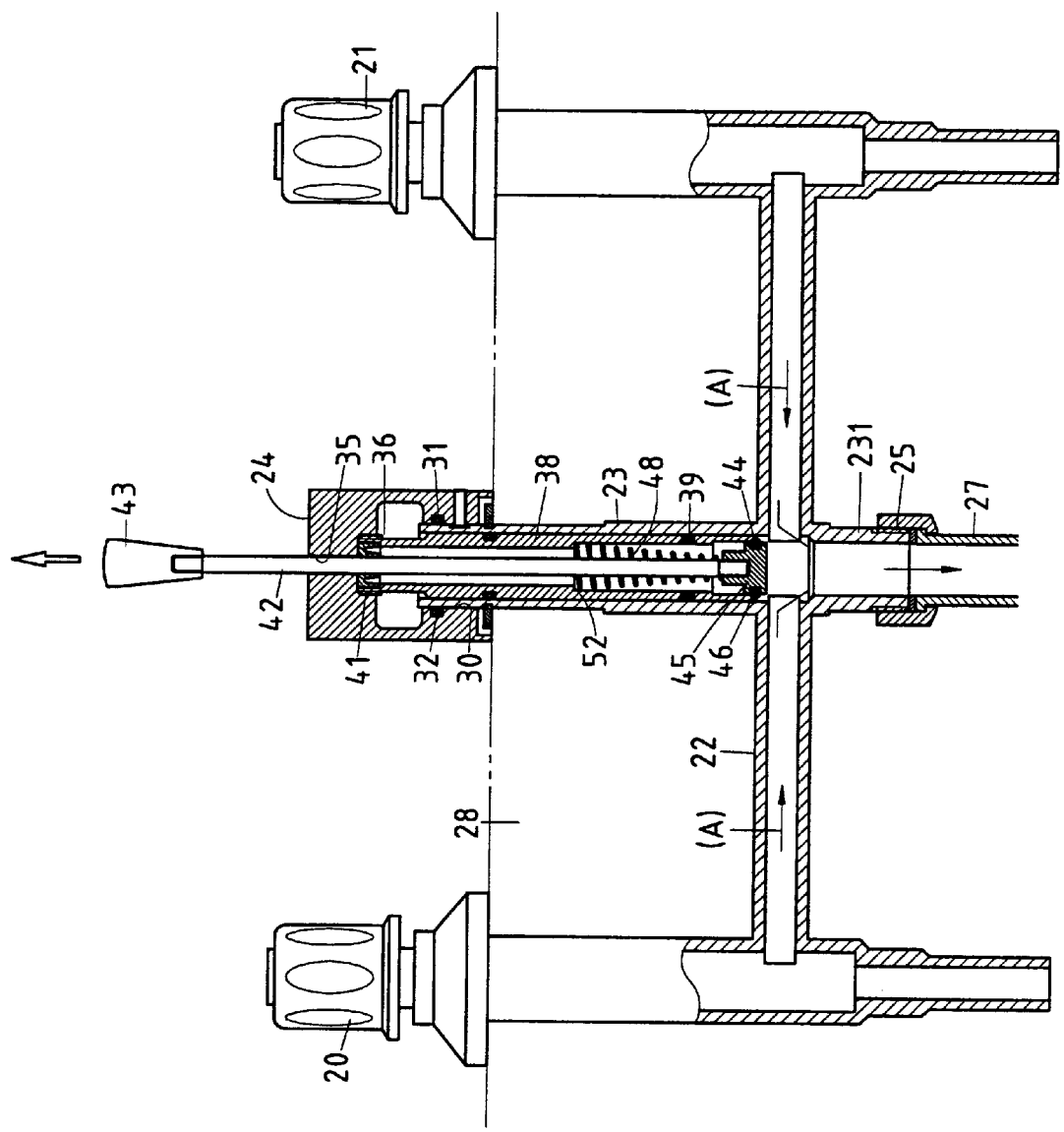
FIG. 6 shows another sectional schematic view of the preferred embodiment of the present invention at work.
Figure 7:
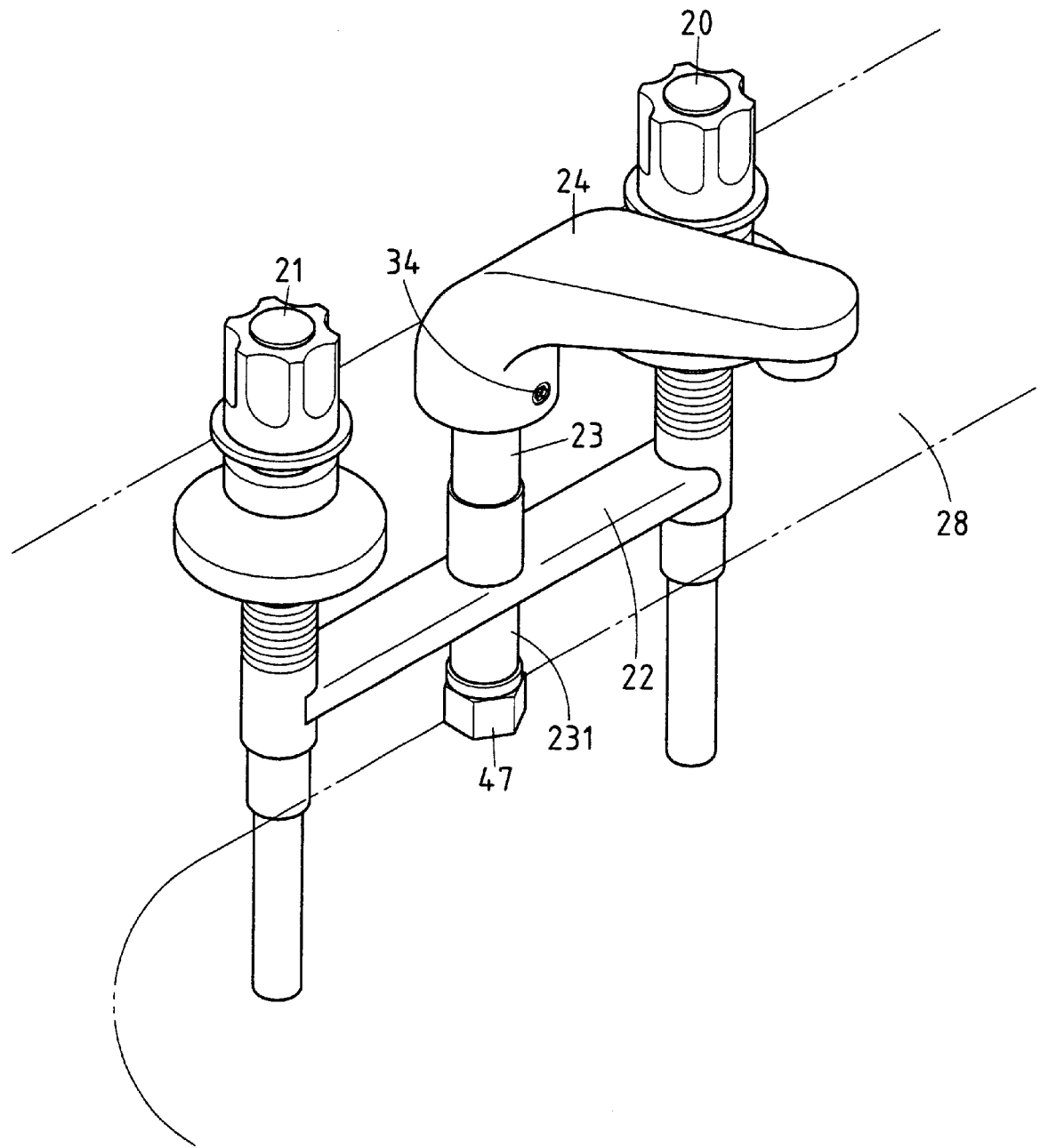
FIG. 7 shows a schematic view of another preferred embodiment of the present invention.

As switches 20 and 21 are turned off, the convergent pipe 22 is free of water. In the meantime, the annular protrusion 45 of the pull rod 42 is urged by the spring 48 to slide downward until the water stopping ring 44 of the annular protrusion 45 is stopped at the juncture of the second support pipe 231 and the convergent pipe 22, as shown in FIG. 5. As the switches 20 and 21 are turned on, the water "A" in the convergent pipe 22 enters the interior of the internal pipe 38 such that the water flows into the faucet 24 via the water hole 40. When the pull rod 42 is pulled upward, the pressure of the water "A" in the convergent pipe 22 forces the annular protrusion 45 to block the bottom port 46 of the internal pipe 38, the water "A" is let out from the shower head 26 via the second support pipe 231 and the guide tube 27, as shown in FIG. 6. The second support pipe 231 may be provided with a shield 47 for shielding the shower head 26 in the event that the shower head 26 will not be in use, as shown in FIG. 7.

I claim:

1. A massage bath tub faucet structure comprising:

a cold water valve;

a hot water valve;

a convergent pipe disposed between said cold water switch and said hot water switch;

a first support pipe connected with said convergent pipe;

a faucet fastened to said first support pipe;

a second support pipe fastened to said convergent pipe such that said second support pipe is connected with a shower head via a guide tube;

a fastening hole located in an interior of said faucet and provided in the inner wall with an annular groove 31 and a washer 30 disposed in said annular groove;

a connection portion 37 located in a top edge of said interior of said faucet and provided with a through hole and an inner threaded portion 36, which are coaxial with said fastening hole;

an internal pipe disposed in said first support pipe and provided in an inner wall with a stepped edge and in a periphery with a plurality of water stepping rings in intimate contact with the inner wall of said first support pipe, said internal pipe further comprised of a water hole in communication with said interior of said faucet, and an outer threaded portion which is engaged with said inner threaded portion of said connection portion;

a pull rod reciprocally disposed in the interior of said internal pipe such that a control portion thereof juts of said through hole of said connection portion, said pull rod being comprised of an annular protrusion having a water stopping ring, and a spring disposed between said annular protrusion of said pull rod and said stepped edge of said internal pipe; and a locating edge located on the outer wall of said first support pipe for positioning said faucet by a bolt whereby said bolt presses against said locating edge.

2. The massage bath tub faucet structure as defined in claim 1, wherein said first support pipe further comprises a retaining slot and a retaining ring disposed in said retaining slot for locating said first support pipe.

* * * * *